Jan. 7, 1941.  L. C. WEATHERS  2,227,471
ELECTRIC MOTOR
Filed Oct. 18, 1938  2 Sheets-Sheet 1

Inventor
Leland Clay Weathers
By Bacon & Thomas
Attorneys

Jan. 7, 1941.  L. C. WEATHERS  2,227,471
ELECTRIC MOTOR
Filed Oct. 18, 1938  2 Sheets-Sheet 2

Inventor
Leland Clay Weathers
By Bacon & Thomas
Attorneys

Patented Jan. 7, 1941

2,227,471

UNITED STATES PATENT OFFICE 2,227,471

ELECTRIC MOTOR

Leland Clay Weathers, Falls Church, Va., assignor to Dawson J. Burns, New York, N. Y.

Application October 18, 1938, Serial No. 235,665

9 Claims. (Cl. 172—239)

This invention relates to electric motors and more particularly to motors and motor systems of the self-synchronous type in which a minimum of conductors are required between the motors thereof and hunting or spinning of any of the various motors of the system is prevented without the employment of mechanical damping means.

An object of the invention is to provide a self-synchronous system including motors having no direct energization from an alternating current source of power and in which such motors are prevented from hunting or spinning.

Another object of the invention is to provide a self-synchronous system in which certain of the motors of said system have no direct energization from a source of alternating current power and in which electrical means is employed to prevent spinning or hunting of any of the various motors of the system.

A further object of the invention is to provide a self-synchronous system in which at least one of the motors thereof requires no energization from a single phase alternating current source of power and in which hunting or spinning of any of the motors of the system is prevented without the employment of any mechanical damping means.

A still further object of the invention is to provide a self-synchronous system in which certain of the motors thereof are energized from a single phase source of alternating current power and in which such motors include electrical connections preventing hunting or spinning of other motors in said system which are not energized from said source of power.

Other objects and advantages of the invention will appear in the following description of preferred embodiments of the invention shown in the attached drawings, of which:

Figure 1:
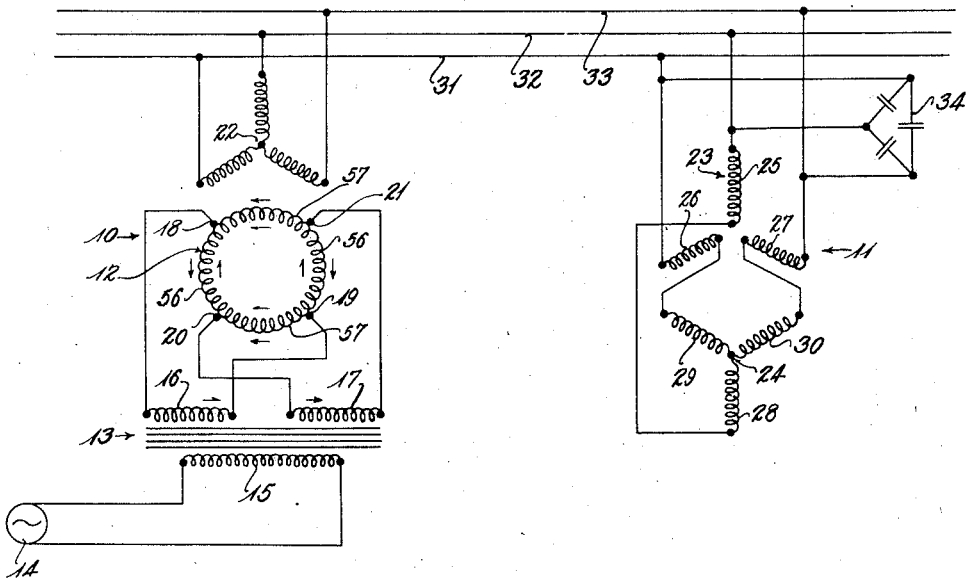
Fig. 1 is a schematic diagram of a self-synchronous system in accordance with the present invention.

Referring to the drawings, and more particularly to Fig. 1, 10 indicates a transmitter and 11 indicates a receiver in accordance with the present invention. For convenience in the following description, the motors which are directly excited from a single phase source of alternating current powers will be designated transmitters and the motors not having such energization will be called receivers. It is, however, understood that either type of motor may be employed for either purpose. The transmitter 10 is provided with a winding 12 upon one member of the motor which winding is energized through a dual excitation transformer 13 from a single phase alternating current source of power 14. The transformer 13 is provided with a primary winding 15 connected to the source of power 14 and two electrically distinct secondary windings 16 and 17. The winding 16 is connected across diametrically opposed points 18 and 19 of the winding 12 and the primary winding 17 of the transformer 13 is connected across diametrically opposed points 20 and 21 of the winding 12. The points 18 and 19 are preferably spaced 90 electrical degrees from the points 20 and 21 so that the winding 12 is energized along the two quadrature axes from the transformer windings 16 and 17. The transmitter 10 is also provided with a phase wound winding 22 upon the other member thereof, which is preferably a Y-connected winding although a Δ or mesh winding may be employed. Both windings 12 and 22 are preferably distributed windings positioned in slots upon the respective members of the motor 10. The motor 11 includes a phase wound winding 23 upon one member of the motor and a phase wound winding 24 upon the other member. The winding 23 includes coils 25, 26 and 27 connected in series with the coils 28, 29 and 30, respectively, of the winding 24. Both windings 23 and 24 are preferably distributed windings positioned in slots upon the respective members and the winding 24 is preferably Y-connected although a Δ-connected winding may be employed. The windings 22 and 23 of the motors 10 and 11, respectively, are interconnected by the conductors 31, 32 and 33. Also, the motor 11 is preferably provided with a condenser system 34 connected across the terminals thereof in order to supply exciting current to the inductive windings of the motor 11 and improve the power factor of the system.

With the connections shown, the rotors of the respective motors will assume corresponding positions if at least one of the rotors is free to rotate when the motor 10 is energized from the source of power 14. Any angle of disagreement between the rotors of the two motors will cause currents to flow between the motors which cause torque to be produced in the motors tending to rotate the rotors to zero angle of disagreement. For example, fields produced by such currents will be set up by the windings 23 and 24 of the motor 11. These fields will cut the conductors of the opposite windings to induce voltages which cause currents reacting with the fields to produce torque. This torque is in such a direction as to cause the rotor of the motor to rotate into a position where the fields referred to align with each other and no substantial resultant voltages in the connected windings are produced. In this condition no substantial currents flow through the respective motors.

The rotors, which are free to rotate, of the motors in conventional self-synchronous systems are particularly susceptible to hunting. Whenever an angle of disagreement exists between the motors of the system, any rotor which is free to rotate moves toward the position of zero angle of disagreement. Since this rotor moves through a single phase oscillating field, a single phase induction motor torque is set up in the direction of rotation tending to carry the motor past zero position and also the inertia of the motor tends to carry the rotor past the zero position. The rotor then returns toward zero position from the opposite direction and the same effect is produced. The action of the single phase induction motor torque is cumulative and the amplitude of the oscillation of the rotor around zero position increases until the motor continuously rotates or spins in one direction or the other as a single phase induction motor. In conventional self-synchronous systems, various types of friction damping means have been employed to damp such oscillations and prevent spinning. Such mechanical damping means provide a friction torque which resists the torque tending to rotate the rotor to zero angle of disagreement and as the restoring torque becomes zero at such zero angle, the rotor ordinarily stops at a position other than at zero angle of disagreement. Since the zero angle of disagreement is ordinarily the desired position of the rotor, mechanical damping means defeat the very purpose of self-synchronous systems. Increasing the size of the various motors is not effective as the frictional damping of the motors must be correspondingly increased. The 3 wire receiver disclosed in Fig. 1 and the other 3 wire receivers shown in Fig. 3 and hereinafter more specifically described, are also subject to such oscillations unless means are employed to prevent the same.

In accordance with the present invention, it has been found possible to eliminate such oscillations in 3 wire receivers without employing mechanical damping means. The single phase induction motor torque above referred to, is caused by an oscillating field in quadrature with the main oscillating field through which the rotator moves. This quadrature oscillating field causes currents to flow through the windings of the motor 11 and by reason of the conductors 31, 32 and 33 connecting the windings of the motor 11 to the windings of the motor 10 similar currents are produced in the windings of the motor 10. By providing a low impedance path for these currents, their magnitude can be made sufficient to set up a field opposing the quadrature oscillating field referred to, such that this field is almost entirely eliminated and no substantial single phase induction motor torque is produced, thus preventing oscillation and spinning. The excitation system, including the dual excitation transformer 13, provides the most effective way known to applicant for opposing the quadrature oscillating field referred to. The secondary windings 16 and 17 of the transformer 13 are connected in quadrature to the winding 12 of the motor 10 and, in any angular direction of the quadrature field referred to one of the windings 16 or 17 provides a low impedance path for the quadrature currents producing this field. To theoretically entirely eliminate the quadrature field, the impedance of the quadrature path through the winding 12 and respective transformer windings 16 and 17, must be equal. The arrangement shown can be made to meet this requirement such that any quadrature field causing hunting is entirely eliminated. This is true irrespective of whether the motor 10 or the motor 11 is the receiver having a rotor free to rotate.

As disclosed in my copending application, Serial No. 220,542, filed July 21, 1938, of which the present application is a continuation in part, the torque gradient at zero angle of disagreement is also markedly improved over that of conventional self-synchronous systems even if the mechanical damping is removed from the receivers of such conventional systems. As also disclosed in the application referred to, the restoring torque becomes substantially a sine function of the angle of disagreement, as contrasted with conventional systems in which the slope of the torque curve at zero angle of disagreement is much less than for a sine function.

Although the dual excitation system of Fig. 1 has certain marked advantages, as hereinafter described, it is unnecessary to apply alternating current excitation through both of the quadrature circuits connected to the winding 12 of the motor 10 of Fig. 1. Thus in the modification of Fig. 2 the transmitter 35 is provided with an external impedance 36 connected across the diametrically opposed points 20 and 21 of the winding 12. The winding 12 may be energized along a single axis from a transformer 37 having a single secondary winding 38 and a primary winding 39 connected to the source of power 14 or the winding 12 could be directly energized from the source 14 as shown, for example, in Fig. 3. If the external impedance 36 is the same as the equivalent impedance of the transformer secondary winding 38, or if the impedance 36 of Fig. 2 is the same as the source 14 when the winding 12 is directly energized therefrom, substantially the same results of those produced by the system of Fig. 1 are obtained.

Figure 2:
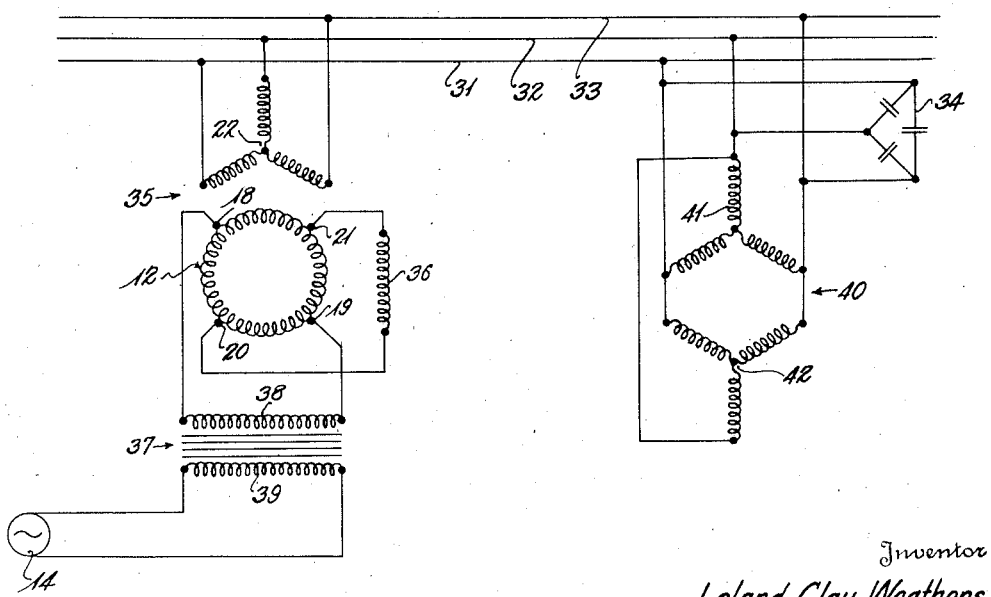
Fig. 2 is a view similar to Fig. 1 showing a modified self-synchronous system.

In order to illustrate the fact that different types of 3 wire receivers may be employed in combination with the transmitters of Figs. 1 and 2, a somewhat modified type of 3 wire receiver 40 is disclosed in Fig. 2. This receiver is provided with windings 41 and 42 upon the relatively rotatable members of the motor 40 with the windings 41 and 42 connected in parallel instead of in series as in Fig. 1. The windings 41 and 42 are preferably Y-connected distributed windings positioned in slots upon the respective members of the motor although Δ connected windings may be employed.

In actual practice, the impedance of the quadrature circuit including the impedance 36 of Fig. 2 may vary quite widely from the impedance of the circuit including the transformer secondary winding 38 or the source 14 and still sufficiently damp the quadrature field to prevent hunting or spinning of the motors. As the impedance of the quadrature circuit including the impedance 36 varies from that of the other quadrature circuit, the damping effect becomes less and the torque gradient at zero angle of disagreement also becomes somewhat less and assumes a value somewhere between that of the system of Fig. 1 and conventional self-synchronous systems. If the impedance of the source 14 is relatively low it has even been found that the points 20 and 21 of the winding 12 may be connected together by a short circuit connection 43' and still produce sufficient damping of the quadrature field referred to prevent hunting or spinning of the motors. In this case also, the torque gradient at zero angle of disagreement is not as great as that of the system of Fig. 1 but is markedly greater than conventional self-synchronous systems.

Figure 3:
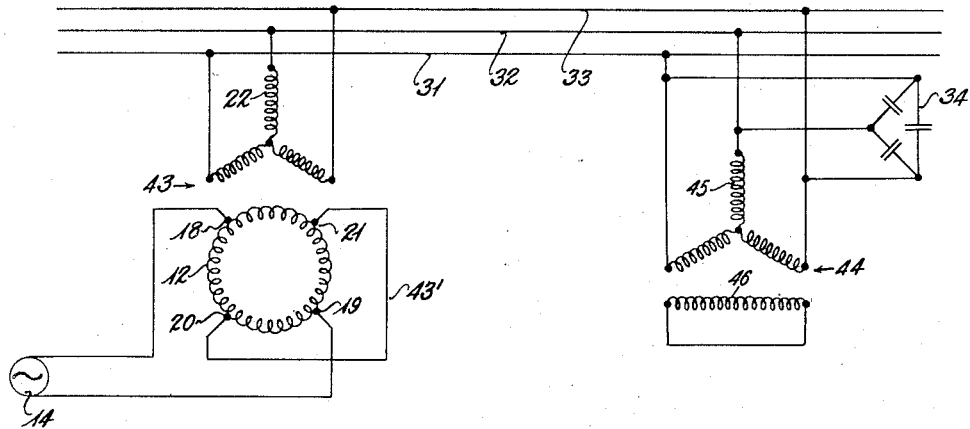
Fig. 3 is a similar view showing a further modified self-synchronous system.

A somewhat different type of 3 wire receiver 44 has been illustrated in Fig. 3 to further illustrate the fact that other types of 3 wire receivers may be employed in the systems of the present invention and that hunting or spinning can be prevented therein by the electrical means disclosed. This receiver includes a phase wound winding 45 upon one member of the motor and a short circuited winding 46 upon the other member. The winding 45 is preferably a Y-connected distributed winding positioned in slots upon its member although a Δ-connection may be employed. The winding 46 may be either a distributed winding positioned in slots upon its member or a concentrated winding, although a distributed winding is preferred. Any of the receivers 11, 40 or 44 of Figs. 1, 2 and 3 may be employed with any of the transmitters 10, 35 or 43 of these figures and may also be employed with the transmitter 47 of Fig. 4.

Figure 4:
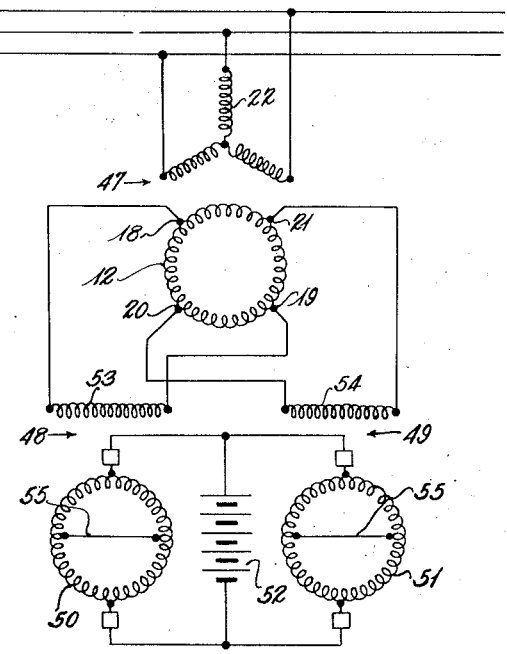
Fig. 4 is a similar view showing a motor in accordance with the present invention.

The transmitter 47 of Fig. 4 is similar to that of Fig. 1 except that separate single phase alternators 48 and 49 are employed to excite the winding 12 along the quadrature axes. Thus the alternators 48 and 49 may include field windings 50 and 51, respectively, energized from any suitable source of direct current power such as a battery 52. The alternator 50 has a secondary winding 53 connected diametrically across the diametrically opposed points 18 and 19 of the winding 12 and the alternator 49 has a secondary winding 54 connected across the diametrically opposed points 20 and 21 of the winding 12. This arrangement also provides two electrically distinct sources of single phase alternating current power in phase with each other as is the case of the transformer 13 of Fig. 1. The rotors of the alternators 48 and 49 should be driven at the same speed and preferably be mounted upon the same shaft so as to be maintained in the same angular position with respect to their secondary windings 53 and 54. This enables the alternating current voltages produced in the windings 53 and 54 to be maintained in phase with each other. Single phase alternating current generators ordinarily produce voltages having substantial harmonics due to quadrature oscillating fields therein which may effect the stability of the motors of self-synchronous systems. Such oscillating quadrature field may be largely eliminated by the quadrature short circuited connections 55 of the field windings of these alternators as disclosed in my application above referred to. The quadrature circuits including the alternator secondary windings 53 and 54 will have substantially the same impedance such that oscillating quadrature fields in the transmitter 47 and 3 wire receivers connected thereto will be substantially entirely eliminated. Thus a system in accordance with the present invention including the transmitter 47 will have substantially the same voltage gradient at zero angles of disagreement as the system of Fig. 1 and no hunting or spinning of the various motors of the system results. Any of the receivers illustrated in the various figures can be employed with any of the transmitters and any number of motors may be interconnected as long as the motor employed as the transmitter has sufficient capacity to drive the other motors. In general, any motor energized from the external source will be provided with one of the connections shown for reducing the quadrature field, although, in some instances, such connections may be omitted from certain of such motors without causing hunting in the system.

Figure 5:
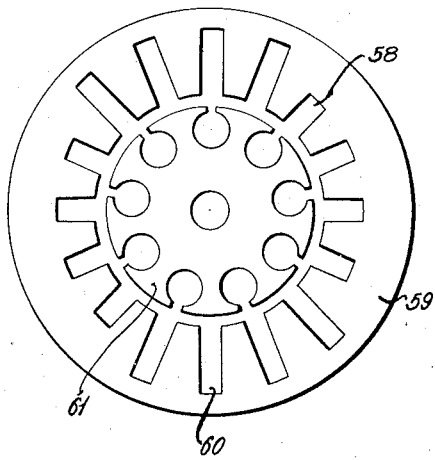
Fig. 5 is a diagrammatic end view of the members of certain of the motors of the present invention illustrating the slot arrangement thereof.

Under normal operation of the transmitters 10 and 47 of Figs. 1 and 4, respectively, only diametrically opposed portions of the windings 12 of these motors carry current. Thus in Fig. 1 the half-arrows applied to the transformer secondary winding 16 and to the winding 12 illustrate an instantaneous current condition in the windings 16 and 12 produced by the winding 16. The full arrows likewise indicate an instantaneous current condition due to the winding 17. It will be noted that the currents in diametrically opposed portions 56 of the winding 12 oppose each other while these currents add in the diametrically opposed portions 57 of the winding 12. This condition holds for all portions of the alternating current cycle. Thus the portions 56 of the winding 12 do not carry any substantial amount of current in the absence of a quadrature oscillating field in the motors of the system. The wire in the coils making up the portions 56 of the winding 12 may, therefore, be smaller and the coils themselves may be smaller than the coils taking up the portions 56 of the winding 12, even though all of the coils of the motor have the same number of turns. The relatively rotatable members of the motors may be of the usual laminated iron construction and by employing a full pitch winding the smaller coils may be positioned in smaller slots 58 of one of the motor members 59 as shown in Fig. 5 and the larger coils of the portion 57 may be positioned in larger slots 60 of the member 59. The number of coils in the winding 12 is preferably quite large but may be of any desired number as long as the number is divisible by 4 in order to provide for the quadrature connections to this winding. The other member of the motor 61 has also been illustrated in Fig. 5 and this member is likewise provided with slots containing coils which may be of any desired number as long as this number is divisible by 3 in order to provide for the phase connection illustrated in the various figures. Ordinarily the number of slots and coils positioned upon one member is made different than the number of slots or coils of the other member in order to avoid interlocking between the teeth thereof, and the laminations of at least one of the members are preferably skewed for the same purpose. Either of the windings of any of the motors illustrated may be positioned upon either member of the motors, and it will be understood that suitable slip rings and brushes will be provided for connections to the windings positioned upon the rotatable members. Although the receivers of the various figures have been shown as being directly connected to the transmitters, differential motors may be connected therebetween without changing the operation of the systems. Hunting or spinning of the differential motor will likewise be prevented and its torque gradient at zero angle of disagreement increased.

While I have disclosed the preferred embodiments of my invention, it is understood that the details thereof may be varied within the scope of the following claims:

What I claim is:

1. In a self-synchronous system, a source of alternating current power, a first motor having relatively rotatable members, a closed primary winding upon one of said members and a phase wound secondary winding upon the other of said members, said source of alternating current power having two electrically independent circuits having substantially the same impedance and providing voltages in phase with each other, each of said circuits being connected across said primary winding, the points of connection of one of said circuits being substantially in quadrature with the points of connection of the other of said circuits, and a second motor having relatively rotatable members with windings positioned thereon, at least one of the windings of said second motor being a phase wound winding connected to said secondary winding, the windings of said second motor having no direct energization from said source of alternating current power.

2. In a self-synchronous system, the combination of, a source of alternating current power, a first motor having relatively rotatable members, a primary winding upon one of said members and a phase wound secondary winding upon the other of said members, a second motor provided with relatively rotatable members having windings positioned thereon, at least one of the windings of said second motor being a phase wound winding connected to said secondary winding, said second motor having no direct energization from said alternating current source of power, a transformer having a primary connected to said source of power and two secondary windings, said secondary windings of said transformer having substantially equal impedances and each being connected substantially diametrically across the primary winding of said first motor, the points of connection of one of said secondary windings of said transformer to said primary windings of said first motor being substantially in quadrature with the points of connection of the other secondary winding of said transformer.

3. In a self-synchronous system, an alternating current source of power, a first motor having relatively rotatable members, a primary winding upon one of said members and a secondary winding upon the other of said members, a second motor having relatively rotatable members with windings positioned upon said members having no direct connection with a source of alternating current power, at least one of said windings being connected to said secondary winding, said source of power being connected across said primary winding, and a circuit having an external impedance therein of substantially the same impedance as said source of power connected across said primary winding at points substantially in quadrature with the points of connection of said source of power.

4. In a self-synchronous system, a source of alternating current power, a first motor having relatively rotatable members, a closed primary winding upon one of said members and a phase wound secondary winding upon the other of said members, said source of alternating current power having two electrically independent circuits having substantially the same impedance and providing voltages in phase with each other, each of said circuits being connected across said primary winding, the points of connection of one of said circuits being substantially in quadrature with the points of connection of the other of said circuits, and a second motor having relatively rotatable members with windings positioned thereon, the windings of said second motor being phase wound windings connected together and to the secondary winding of said first motor.

5. In a self-synchronous system, the combination of, a source of alternating current power, a first motor having relatively rotatable members, a primary winding upon one of said members and a phase wound secondary winding upon the other of said members, the windings of said second motor being phase wound windings connected together and to the secondary winding of said first motor, a transformer having a primary connected to said source of power and two secondary windings, said secondary windings of said transformer each being connected substantially diametrically across the primary winding of said first motor, the points of connection of one of said secondary windings of said transformer to said primary winding of said first motor being substantially in quadrature with the points of connection of the other secondary winding of said transformer.

6. In a self-synchronous system, an alternating current source of power, a first motor having relatively rotatable members, a primary winding upon one of said members and a secondary winding upon the other of said members, a second motor having relatively rotatable members with windings positioned upon said members, the windings of said second motor being connected together and to the secondary winding of said first motor, said source of power being connected across said primary winding, and a circuit having an external impedance therein of substantially the same impedance as said source of power connected across said primary winding at points substantially in quadrature with the points of connection of said source of power.

7. In a self-synchronous system, the combination of, a source of alternating current power, a first motor having relatively rotatable members, primary windings upon one of said members, phase wound secondary windings upon the other of said members, a second motor having relatively rotatable members with windings positioned upon said members, the windings upon at least one of said members of said second motor being phase wound windings connected to said secondary windings of said first motor, the windings of said second motor having no direct energization from said source of power, an exciting circuit connecting said source of power with said primary windings and another circuit connected to said primary windings substantially in quadrature with said exciting circuit, said other circuit having a total impedance substantially equal to the total impedance of said exciting circuit so as to provide a path for quadrature currents which damp oscillations tending to cause spinning of both said first and second motors.

8. In a self-synchronous system, the combination of two electrically independent sources of exciting current, a first motor having relatively rotatable members, primary windings upon one of said members, phase wound secondary windings upon the other of said members, a second motor having relatively rotatable members with windings positioned upon said members, the windings upon at least one of said members of said second motor being phase wound windings connected to said secondary windings of said first motor, the windings of said second motor having no direct energization from said sources of power, a first exciting circuit connecting one of said sources of power to said primary windings, a second exciting circuit connecting the other of said sources to said primary windings substantially in quadrature with said one source, said exciting circuits having substantially equal total impedances so that paths are provided for quadrature currents which damp oscillations tending to cause spinning of both said motors.

9. In a self-synchronous system, the combination of, a source of alternating current power, a first motor having relatively rotatable members, primary windings upon one of said members, phase wound secondary windings upon the other of said members, a second motor having relatively rotatable members with windings positioned upon said members, the windings upon at least one of said members of said second motor being phase wound windings connected to said secondary windings of said first motor, the windings of said second motor having no energization from said source of power, a transformer having a primary winding connected to said source of power and two secondary windings, said secondary windings of said transformer having substantially equal impedances and being connected to said primary windings of said first motor substantially in quadrature with each other so that substantially equal impedance paths are provided for quadrature currents which damp oscillations tending to cause hunting and spinning of both said motors.

LELAND CLAY WEATHERS.